United States Patent
Stryker

[11] B 4,013,634
[45] Mar. 22, 1977

[54] TETRAAZO DIRECT UREA-DERIVED DYE HAVING A CORE OF H-ACID, K-ACID OR S-ACID

[75] Inventor: Harvey Irvin Stryker, Carneys Point, N.J.

[73] Assignee: E. I. Du Pont de Nemours and Company, Wilmington, Del.

[22] Filed: Feb. 21, 1974

[21] Appl. No.: 444,294

[44] Published under the second Trial Voluntary Protest Program on March 30, 1976 as document No. B 444,294.

[52] U.S. Cl. .............................. 260/167; 260/190; 260/191; 260/198
[51] Int. Cl.² ........................................ C09B 43/14
[58] Field of Search ................. 260/166, 167, 168

[56] References Cited
UNITED STATES PATENTS

| | | | |
|---|---|---|---|
| 2,228,415 | 1/1941 | Sparks et al. | 260/167 X |
| 2,264,681 | 12/1941 | Rossander et al. | 260/168 |
| 2,417,306 | 3/1947 | Krebser et al. | 260/168 X |
| 2,842,538 | 7/1958 | Byland | 260/168 |
| 2,885,391 | 5/1959 | Huss et al. | 260/167 X |

*Primary Examiner*—Charles F. Warren
*Attorney, Agent, or Firm*—James A. Costello

[57] ABSTRACT

Water-soluble polyazo direct dyes for paper and other cellulosics having the formula

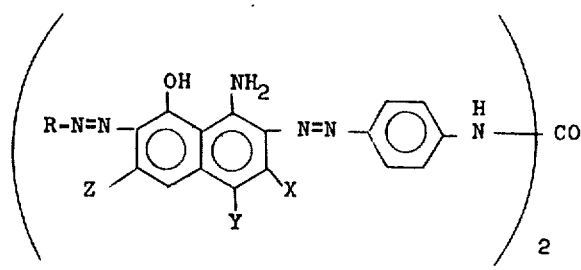

wherein:
R is selected from unsubstituted phenyl, unsubstituted naphthyl, phenyl substituted with up to 3 substituents and naphthyl substituted with up to 3 substituents, said substituents selected from the group methyl, ethyl, methoxy, ethoxy, sulfonic acid, benzothiazolyl, and chlorotrimethylammonium acetyl, and X, Y and Z are substituted so as to give derivatives of at least one of 1-amino-8-naphthol-4,6-disulfonic acid, 1-amino-8-naphthol-3,6-disulfonic acid, and 1-amino-8-naphthol-4-sulfonic acid.

5 Claims, No Drawings

TETRAAZO DIRECT UREA-DERIVED DYE HAVING A CORE OF H-ACID, K-ACID OR S-ACID

BACKGROUND OF THE INVENTION

The blue and green dyes of this invention are useful for dyeing paper and other cellulosics. These dyes have high aqueous solubility for ease of handling and measuring, as well as very good cellulosic substantivity. The dyes of this invention are derived from disazo dyes and are to be distinguished from dyes that are derived from monoazo dyes.

SUMMARY OF THE INVENTION

This invention concerns water-soluble polyazo direct dyes of the formula

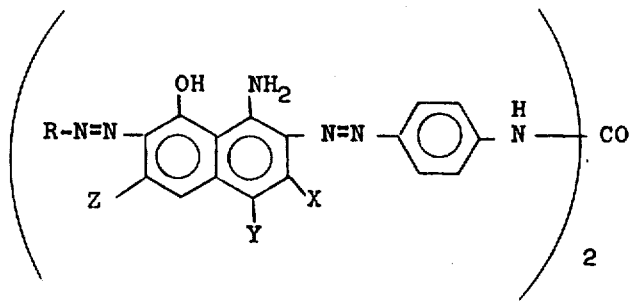

wherein:
R is selected from unsubstituted phenyl, unsubstituted naphthyl, phenyl substituted with up to 3 substituents and naphthyl substituted with up to 3 substituents, said substituents selected from the group methyl, ethyl, methoxy, ethoxy, sulfonic acid, benzothiazolyl, and chlorotrimethylammonium acetyl, and X, Y and Z are substituted so as to give derivatives of at least one of 1-amino-8-naphthol-4,6-disulfonic acid, 1-amino-8-naphthol-3,6-disulfonic acid, and 1-amino-8-naphthol-4-sulfonic acid.

The dyes can be made by coupling first one and then a second diazonium salt to an aminonaphtholsulfonic acid susceptible to azo coupling in two positions. The limited group of useful acids includes H acid (1-amino-8-naphthol-3,6-disulfonic acid), K acid (1-amino-8-naphthol-4,6-disulfonic acid), and S acid (1-amino-8-naphthol-4-sulfonic acid). While J acid can be used, it is not preferred.

The general reaction sequence for preparing the novel dyes is illustrated as follows, employing aniline as the R group coupler, and H acid:

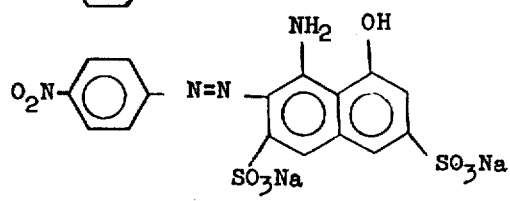

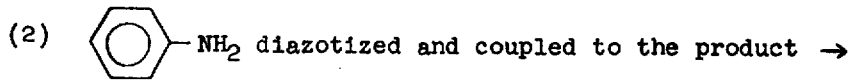

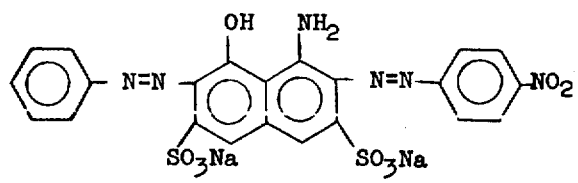

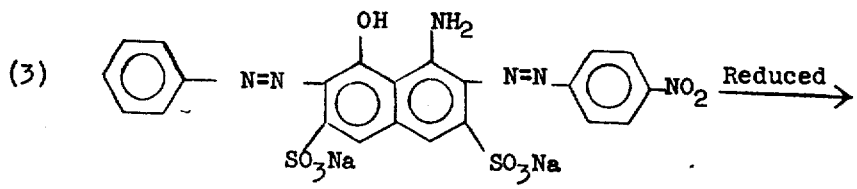

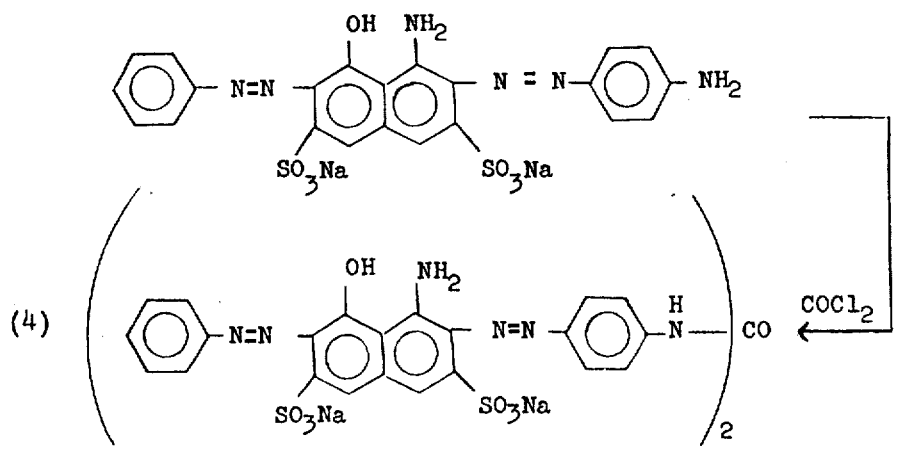

As second aniline or naphthylamine compound (to provide the R group in the general formula) there can also be used, aniline, 2-methoxy-5-methylaniline, sulfanilic acid, metanilic acid, 2-(p-aminophenyl)-6-methylbenzothiazole, 2-amino-6-naphthalenesulfonic acid, 2-amino-6,8-naphthalenedisulfonic acid and p-aminophenacyltrimethylammonium chloride. Aniline is preferred as is the 2-amino-6-naphthalenesulfonic acid.

Many variations of the well-known procedures for diazotization and coupling benzene and naphthalene derivatives can be employed in preparing the dyes of the invention. In one method of synthesis, p-nitroaniline can be diazotized in an aqueous slurry with hydrochloric acid and sodium nitrite at 0° to 25°C., and aqueous aminonaphtholsulfonic acid solution at pH 5 to 6 and 25°C. added to the diazonium salt acid slurry with concurrent addition of alkali solution to maintain pH of the coupling reaction at about 1. In another vessel, one of the described aniline or naphthylamine compounds can be diazotized in aqueous slurry with hydrochloric acid and sodium nitrite at about 20°C. and added to the first product which has been adjusted to pH 7 with alkali solution.

After the second coupling the nitro group can be reduced with sodium sulfhydrate under alkaline conditions at about 40°C. After destruction of excess sulfhydrate with sodium bisulfite, the product can be isolated by acidifying the reaction mass to pH 4 with hydrochloric acid, adding salt, and finally filtering.

After washing with 12 to 15% sodium chloride brine the product can be dissolved in water at pH 7 by warming to about 70°C. and neutralizing with alkali solution. Phosgene can be added at 70° to 75°C. with pH maintained at 6.5 to 7.0 by simultaneously adding alkali solution. When phosgenation is complete, the product is isolated by salting out at pH 7.0 to 8.0 and filtering. It can be dried at temperatures up to about 100°C.

When either K acid or S acid is employed in place of H acid as the aminonaphtholsulfonic acid, because of the low solubility of their disazo products, reduction and phosgenation will proceed rather slowly unless a water-miscible cosolvent is employed. Representative cosolvents are methyl carbitol, 2-ethoxyethanol and the like.

The dyes of the invention exhibit better than 1.0% solubility in water in their sodium or lithium salt form. They are quite substantive to paper and can also be used to dye cotton and rayon. Maximum color development is attained when dyeings are carried out at 4.5 to 6.0 pH and at temperatures of about 50°C. The products dye cellulosic material in dark shades of green to blue. For the usual beater dyeing of paper a solution of the dye is added to the pulp slurry in the presence of size and alum at pH 4 to 5. For tissue paper dyeings, where size and alum are not used, the dye solution is added to the pulp slurry at pH 7 to 8.

The following Examples are offered to further illustrate the invention. They are not meant to limit the invention in any way.

EXAMPLE 1

A. P-Nitroaniline (69 grams) was slurried in 900 ml of water containing 1 gram of a nonionic surfactant and 125 ml of 37.5% hydrochloric acid. The mass was cooled to about 5°C., and 102 ml of 5N aqueous sodium nitrite solution was added as rapidly as possible while maintaining temperature below 12°C. After stirring one-half hour, the excess nitrite was destroyed by adding a little sulfamic acid.

In another vessel there was prepared 1,500 ml of a 0.5M solution of H acid, the solution being adjusted to 25°C. and 5.6 pH. The H acid solution was added to the diazonium salt solution over one-half hour, while 10% sodium hydroxide solution was added simultaneously to keep pH at 1.0 to 1.4. After the addition was completed, the charge was stirred for about 16 hours at room temperature. A portion of the homogeneous mixture equivalent to 0.2 mole of product was removed for use in part (B).

B. Broenners acid (2-naphthylamine-6-sulfonic acid, 0.2 mole) was mixed with 200 ml of water and 34 ml of 37.5% hydrochloric acid. Diazotization was carried out as in part (A) using 41 ml of 5N sodium nitrite. After stirring for 2 hours the excess nitrous acid was destroyed with a little sulfamic acid solution and was added to 1,100 ml of product (A), (equivalent to 0.2 mol of azo product) which had first been adjusted to 7.0 pH and to which had then been added 42 grams of sodium carbonate. The coupling was performed at about 25°C. and was complete in 3 hours. Final pH was 7.8

C. To the coupling mass from (B) at 30°C. there was added 66 grams of 40% sodium sulfhydrate solution. The temperature rose to 40°C., and the reduction was completed by holding at about 40°C. for an hour. Sufficient sodium bisulfite was added to destroy residual sulfhydrate, and the charge was then acidified to pH 4.0 with hydrochloric acid.

The reduced dye was then salted out by adding 225 grams of sodium chloride, was isolated by filtration and was washed with 250 ml of 15% sodium chloride solution. The wet cake weighed 527 grams. Analysis by titration of a sample with TiCl₃ standard solution indicated 109.5 grams of the next (coupling) step, 42 grams of anhydrous sodium carbonate was added to the reaction mass. The product of this first reaction was

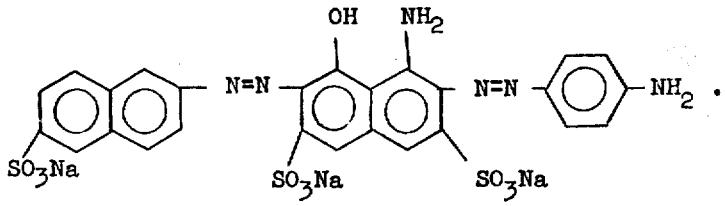

D. The wet cake product (180 grams = 37.4 grams of the dye depicted above) was dissolved in 400 ml of water at pH 7.0 by warming to 70°C. with lithium hydroxide solution of about 20% concentration. Phosgene was bubbled through the solution at 70° to 75°C., while pH was maintained at 6.5 to 7.0 by simultaneously adding more lithium hydroxide solution. The end-point was determined by comparing a sample with a known standard by thin layer chromatography. The following product of this invention was isolated by filtration.

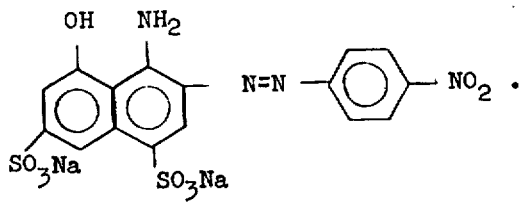

After cooling the mass to 2° ± 2°C. there was added 117 ml of aniline diazonium chloride solution containing 0.331 gram mole. The diazonium salt was prepared

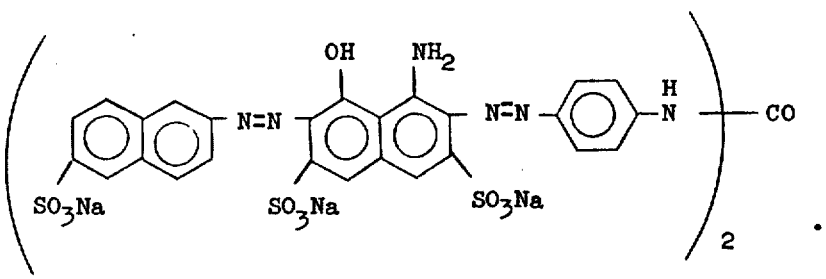

It dyed paper in a dark, blue-green shade. The dye had very good substantivity on paper as shown by unsized dyeings. Substantivity was 80% on paper. The dyed paper showed outstanding resistance to bleeding when wet with water.

Substantivity was determined by comparing the amount of dye removed from solution by paper pulp under standardized test conditions when size and alum were used, and in their absence. Presence of size and alum cause fixing of about 100% of the dye. In the absence of size and alum, considerably less dye is attracted to the paper pulp. Substantivity of 75 to 80% or higher is considered good and indicates that the dye can be used to dye tissue, where size and alum are not used.

EXAMPLE 2

Using the general procedure of Example 1, a solution was prepared of 95.8 grams of K acid in 500 ml of water with pH at 1.9. The k acid solution was added to 475 ml of aqueous diazonium salt solution prepared by diazotizing 45 grams of p-nitroaniline (0.315 mole) as in Example 1. The coupling was performed at 20°C. with pH maintained at 1.0 to 1.5. In order to balance the coupling it was necessary to add another 5% of K acid and another 1½% of p-nitroaniline diazonium salt. When the coupling was finished, pH was adjusted to 8.2 by adding 102 ml of 30% caustic soda solution. Before by diazotizing 123.6 grams of aniline mixed with 1,200 grams of ice and 308 grams of 31.5% hydrochloric acid, using 120 grams of sodium nitrite as 31% aqueous solution. Temperature during the diazotization was held at 1° to 5°C.

The aniline diazo was added to the monoazo dye reaction mass at 1° to 5°C. with pH at about 8.7. The coupling mass was stirred overnight (16 hours) at 1° to 5°C. and was then heated to 70° to 75°C. for 2 hours and the solid product isolated by filtration. There was obtained 608 grams of water-wet filter cake.

One half of the filter cake was slurried in 3,000 ml of water, and 13.9 grams of sodium sulfhydrate (NaSH) was added as 38% aqueous solution over a 20 minute period with reaction temperature at 35° to 36°C. The mass was then stirred at 40°C. for an hour. After the reduction, 300 grams of 10% sodium chloride solution was added and the charge stirred for an hour to salt out the product, which was isolated by filtration. The wet cake weighed 157.3 grams and contained 45.2% of the product

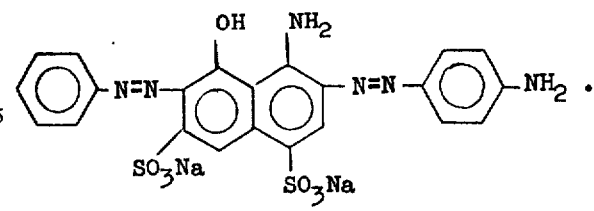

A 40% portion of the cake was phosgenated in a solvent containing 600 grams of water and 386 grams of methyl carbitol. With temperature at 70° ± 2°C. and pH at 6.5 to 7.0 there was added 25 grams of phosgene over one hour. Sodium chloride in the amount of 4% by volume of the reaction mass was added, precipitating the desired dye product which was isolated by filtration and dried in an oven at 75°C.

The dye was successfully employed to color paper in beater dyeings in a dark blue shade.

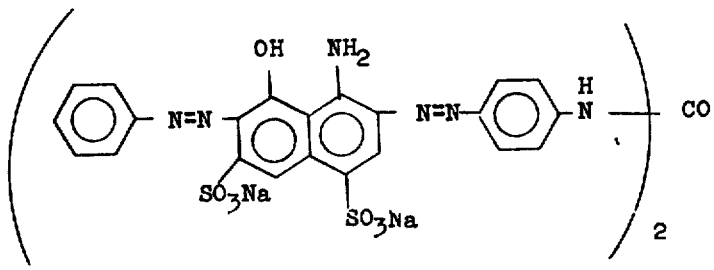

This product dye successfully colored paper in beater dyeings in a dark blue-gray shade.

EXAMPLE 4

A. Into a suitable vessel were charged 30.0 parts of water, 4.35 parts of p-nitroaniline, 3.42 parts of HCl as 31% hydrochloric acid, and 15.0 parts of ice, bringing the temperature of the mass to about 10°C. To the charge in the vessel was added 2.32 parts of $NaNO_2$ in the form of 31% aqueous solution. Temperature rose to about 20°C. and was maintained at 18° to 22°C. for 35 minutes. Excess nitrous acid was eliminated by adding a little sulfamic acid.

In a second vessel there was prepared a slurry containing 50 parts of water, 10.23 parts of H acid with sufficient hydrochloric acid to adjust the pH to 3±0.2. Ice and water were added to give a total of 90.0 parts of slurry at 18° to 22°C.

As soon as the excess nitrous acid was eliminated from the p-nitroaniline diazo, the H acid slurry was added thereto over a one-half period, holding the temperature near 20°C. by adding ice. The coupling mass was stirred for three-fourths hour, then sodium formate was added to raise the pH to 1.3, 3.85 parts being required. The charge was stirred at pH 1.3±0.2 for 4 hours to complete the coupling.

B. A suitable vessel was charged with 2.85 parts of HCl as 31% hydrochloric acid, 30.0 parts of ice and 3.08 parts of aniline. After stirring 15 minutes there was added 2.28 parts of sodium nitrite as 31% aqueous solution. Temperature was maintained at 0° to 4°C. by adding ice. After 15 minutes stirring the prepared aniline diazo was ready for coupling to the azo compound slurry prepared in (A).

C. To the azo slurry prepared in (A) was added 4.4 parts of NaOH as 30% aqueous solution to adjust the pH of the slurry to about 8.5, and the mass held for 30 minutes to establish the pH. Then 4.2 parts of $Na_2CO_3$

EXAMPLE 3 using the procedure of Example 2 a solution was prepared of 71.8 grams of S acid in 500 ml of water with pH at 1.8. The S acid solution was added to 475 ml of aqueous diazonium salt solution prepared by diazotizing 45 grams of p-nitroaniline. The coupling was performed at 15°C. with pH at 1.0 to 1.5. In order to balance the coupling it was necessary to add another 9% of S acid. When the coupling was finished, pH was adjusted to 8.3 by adding 87 ml of 30% caustic soda solution. Before the next (coupling) step 42.0 grams of anhydrous sodium carbonate was added to the reaction mass. The product of this first reaction was

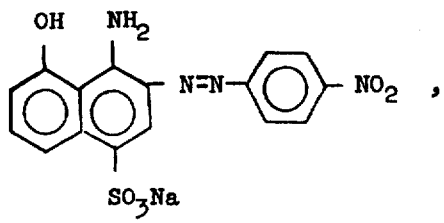

which was then treated by the procedure used in Example 2 to produce the dye

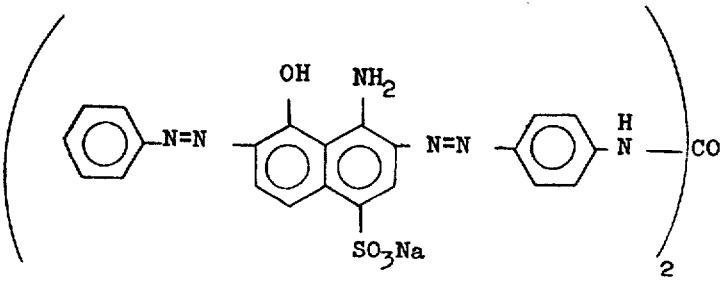

was added along with enough ice to bring the temperature to 0° to 1°C. The aniline diazo from (B) was added to the azo slurry over about 1 ½ hours, ice being used to keep temperature below 5°C. Coupling pH was kept at 8.6 to 9.0 by adding Na₂CO₃ as required. After 30 minutes stirring the coupling was finished, producing

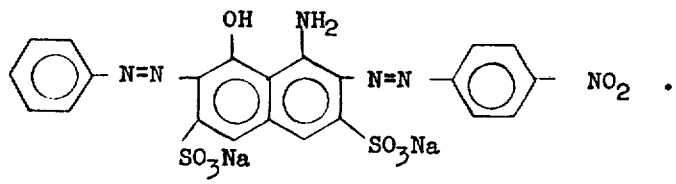

D. In this step the NO₂ group of the above dye was reduced to NH₂. The mass from (C) was heated to 30°C. and the pH checked and adjusted to about 8.5. Then 2.78 parts of 100% NaSH was added as 40% aqueous solution over a 50 to 60 minute period. The reaction was exothermic, and some ice was added to keep the temperature at 36° to 40°C. When reduction was complete, 30.0 parts of NaCl was added over 30 minutes and the salted mass stirred for 2 to 3 hours to complete precipitation of the product. The solid product was then isolated by filtration. Care was taken that the product and filtrate not contact acid which would produce the poisonous gas, hydrogen sulfide.

E. Into a suitable vessel were charged 68.8 parts of water and 11.73 parts of the product obtained in (D). The 11.73 parts are of the dry, 100% material synthesized. It was actually added in the form of the filter press cake as isolated. The slurry was stirred for 2 hours to produce a uniformly dispersed slurry. it was then transferred to a phosgenation reactor and the volume adjusted to a total of 130.0 parts by addition of water. Before adding phosgene the mass was heated to 68°C. and the pH adjusted to about 6.6 Phosgene was added at a rate of 0.45 part per hour maintaining temperature at 68° ± 5°C., and pH at 6.6 ± 0.3 by simultaneous addition of 30% sodium hydroxide solution. Phosgene addition was continued until thin layer chromatogram tests indicated that all of the starting material had been reacted. When phosgenation was complete, the pH was adjusted to 7.8 with temperature still at 68°±5°C. The charge at this point constituted 140 parts. To it were added 14 parts of sodium chloride over a one-half hour period. The salted mass was then stirred for an hour and the solid product isolated by filtration. The press cake was dried in an oven at 90° to 100°C., yielding 14.85 parts of the novel dye The dye colored paper in beater dyeings in a dark green shade. It was outstandingly substantive on paper as shown by unsized dyeings, and the dyed paper did not bleed color when wet with water. Substantivity was 80%, that is 80% as much dye was affixed to paper in unsized dyeings as compared with sized dyeings in which essentially all of the dye in the bath was removed by the paper.

The embodiments of the invention in which an exclusive property or privilege is claimed are defined as follows:

1. A water-soluble dye of the formula

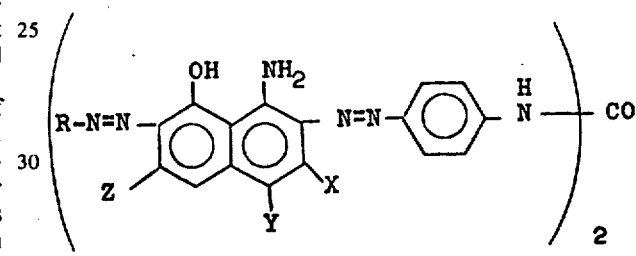

wherein:
R is selected from unsubstituted phenyl, unsubstituted naphthyl, phenyl substituted with up to 3 substituents and naphthyl substituted with up to 3 substituents, said substituents selected from the group methyl, ethyl, methoxy, ethoxy, sulfonic acid, and chlorotrimethylammonium acetyl, and
X, Y and Z are substituted so as to give derivatives of at least one of 1-amino-8-naphthol-4,6-disulfonic acid, 1-amino-8-naphthol-3,6-disulfonic acid, and 1-amino-8-naphthol-4-sulfonic acid.

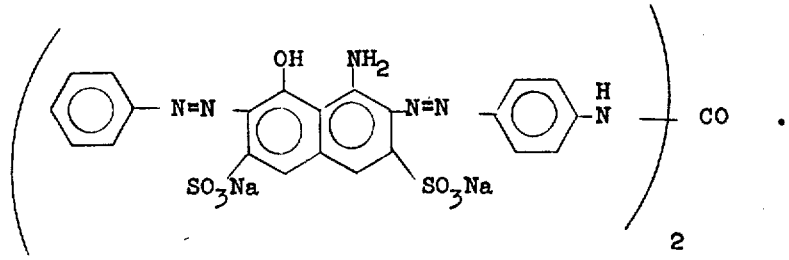

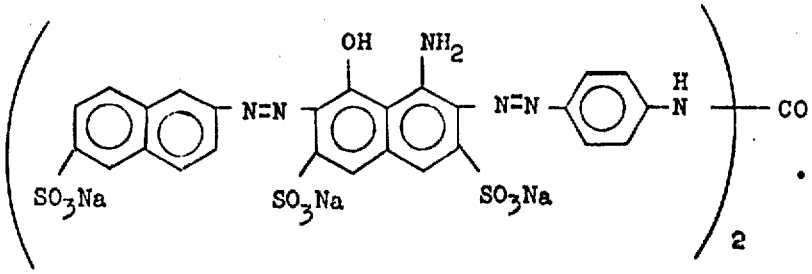

3. A dye according to claim 1,
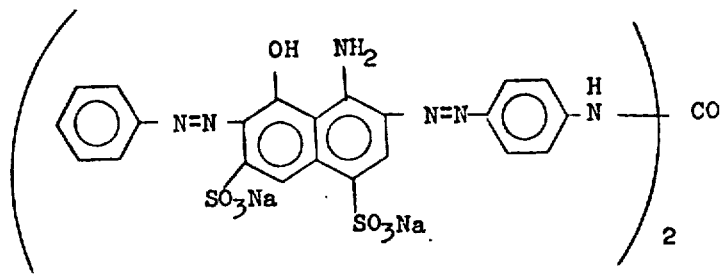
5. A dye according to claim 1,
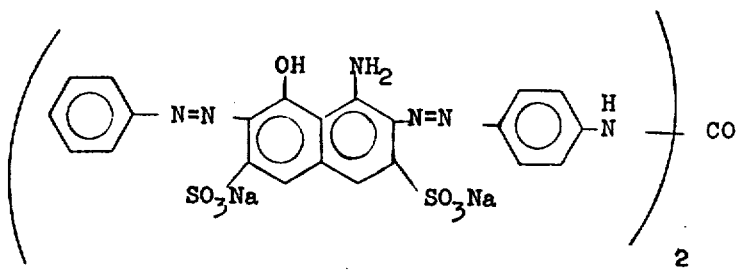
4. A dye according to claim 1,
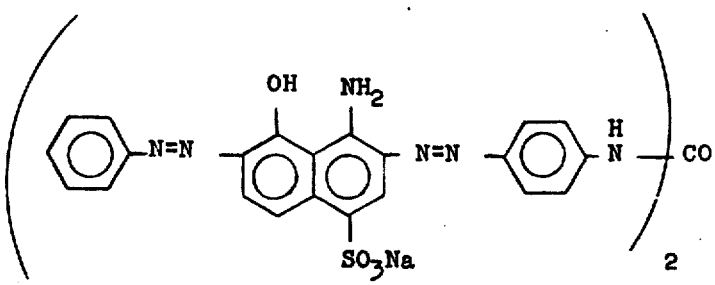

2. A dye according to claim 1,